(12) United States Patent  (10) Patent No.: US 8,935,816 B1
Sweet  (45) Date of Patent: Jan. 20, 2015

(54) MATTRESS DECK SLIDE (71) Applicant: Frank Sweet, Henryetta, OK (US)

(72) Inventor: Frank Sweet, Henryetta, OK (US)

( * ) Notice: Subject to any disclaimer, the term of this patent is extended or adjusted under 35 U.S.C. 154(b) by 0 days.

(21) Appl. No.: 14/326,136

(22) Filed: Jul. 8, 2014

(51) Int. Cl.
A47C 19/04 (2006.01)
B60P 3/38 (2006.01)

(52) U.S. Cl.
CPC .. A47C 19/04 (2013.01); B60P 3/38 (2013.01)
USPC .......... 5/146; 5/17; 5/18.1; 5/81.1 HS; 5/118; 5/147; 5/308

(58) Field of Classification Search
CPC ........ A47C 17/32; A47C 17/80; A47C 19/04; B60P 3/34
USPC ....... 5/18.1, 17, 81.1 HS, 146, 147, 158, 181, 5/251, 661, 20, 47, 58, 118, 308, 931
See application file for complete search history.

(56) References Cited

U.S. PATENT DOCUMENTS

| | | | | |
|---|---|---|---|---|
| 1,413,595 A * | 4/1922 | Kreuzkamp | ..................... | 5/18.1 |
| 2,692,009 A * | 10/1954 | Warshaver | ........................... | 5/58 |
| 2,997,724 A * | 8/1961 | Heumann | ........................ | 5/18.1 |
| 3,385,631 A * | 5/1968 | Gertler | ........................... | 297/111 |
| 3,483,573 A * | 12/1969 | Lucero | ................. | 5/19 |
| 3,583,755 A * | 6/1971 | Hedrick, Jr. | ................... | 296/170 |
| 3,688,321 A * | 9/1972 | Moss et al. | ........................ | 5/661 |
| 3,710,403 A * | 1/1973 | Weidner et al. | ................... | 5/18.1 |
| 4,548,438 A * | 10/1985 | Myers | ........................... | 296/160 |
| 4,573,225 A * | 3/1986 | Wolf | ........................... | 5/118 |
| 4,826,235 A * | 5/1989 | Zwick | ........................ | 296/170 |
| 4,928,332 A * | 5/1990 | Ogden et al. | ...................... | 5/614 |
| 5,020,173 A * | 6/1991 | Dreyer, Jr. | ........................ | 5/308 |
| 5,794,283 A * | 8/1998 | Vila et al. | ........................ | 5/18.1 |
| 6,134,724 A * | 10/2000 | Brown | ........................... | 5/18.1 |
| 6,217,106 B1* | 4/2001 | Reckner, Jr. | ................... | 296/173 |
| 6,463,603 B1* | 10/2002 | Camfield | ........................ | 5/18.1 |
| 6,588,837 B1* | 7/2003 | Schultz et al. | ................ | 297/111 |
| 6,698,818 B2* | 3/2004 | Crean | ........................... | 296/175 |
| 6,802,091 B1* | 10/2004 | Harris | ........................ | 5/81.1 R |
| 6,857,689 B2* | 2/2005 | Dodgen | ........................ | 296/156 |
| 7,367,069 B2* | 5/2008 | Connell et al. | ..................... | 5/136 |
| 8,186,744 B1* | 5/2012 | Hanser et al. | ................. | 296/170 |
| 2004/0017096 A1 | 1/2004 | Crean | | |
| 2005/0166318 A1* | 8/2005 | Bokser | ............... | 5/308 |
| 2007/0079437 A1* | 4/2007 | Jefferis | ............. | 5/18.1 |

* cited by examiner

Primary Examiner — Nicholas Polito
Assistant Examiner — David R Hare
(74) Attorney, Agent, or Firm — Head, Johnson & Kachigian, P.C.

(57) ABSTRACT

A bed that allows a user to easily slide the mattress away from the wall for making the bed or changing the sheets without having to reach around the nightstand or other furniture and then slide the mattress back into place for use.

6 Claims, 7 Drawing Sheets

MATTRESS DECK SLIDE

CROSS REFERENCE

Not Applicable.

BACKGROUND OF THE INVENTION

1. Field of the Invention

This invention relates generally to a mattress deck slide, and more particularly, but not by way of limitation, to a system that allows for sliding a mattress forward for easy access during sheet changes and for making the bed, particularly suitable for use in a recreational vehicle.

2. Description of the Related Art

Recreational vehicles often have built-in furniture to prevent the furniture from sliding when the vehicle is in motion. Such furniture is often closely arranged, as space is at a premium. One commonly built-in arrangement is a bed on a fixed frame with nightstands fixed alongside the frame at the head of the bed. This limits access to the head of the mattress, forcing the user to bend awkwardly during sheet changes and while making the bed. This can be particularly challenging to older users, a key demographic for recreational vehicles.

Similar problems may be encountered anytime a bed is made or sheets are changed on a bed with adjacent nightstands, whether located in a home, a hotel, or elsewhere. This is true regardless of whether the furniture is actually fixed, as a user is not likely to want to move such furniture just to make the bed or change the sheets, even if they can.

Based on the foregoing, it is desirable to provide a system that allows a user to slide the mattress forward, allowing the user to access the top of the mattress without bending past the nightstand.

It is further desirable for such a system to require minimal physical exertion, making the system easy to use for all users, including those with physical limitations.

It is further desirable for such a system to be automated.

It is further desirable for such a system to be capable of either being built-in to a new mattress deck or being retrofitted to an existing mattress deck.

SUMMARY OF THE INVENTION

In general, in a first aspect, the invention relates to a bed with a head, a foot, and two opposing sides, the bed comprising: a base; a bed deck atop the base, where the bed deck has a top and a bottom; a mattress deck atop the bed deck, where the mattress deck has a top and a bottom; and an actuator attached to the bed deck, where the actuator has a shaft attached to the mattress deck such that activating the actuator causes the mattress deck to slide relative to the bed deck from a non-extended position to an extended position and vice versa.

The bed deck may have a plurality of rails attached to the top of the bed deck, where the rails are parallel to each other and to the sides of the bed, and the mattress deck may have at least two rails attached to the bottom of the mattress deck, where the rails are parallel to each other and to the sides of the bed and where the rails are each located such that they are adjacent to one of the rails of the bed deck.

The bed may further comprise a hollow area in the base under the bed deck, where the actuator is attached to the bottom of the bed deck and extends into the hollow area. Additionally, there may be a hole in the mattress deck; a slot in the bed deck, where the slot runs parallel to the sides of the bed and is aligned at one end with the hole in the mattress deck when the mattress deck is in the non-extended position and at the other end with the hole in the mattress deck when the mattress deck is in the extended position; and a bolt extending through the hole in the mattress deck and the slot in the bed deck and attached to the shaft of the actuator. The bed deck may be attached to the base via one or more hinges.

The actuator may be positioned such that the mattress deck slides toward the head of the bed or toward the foot of the bed, but not toward either side of the bed. The mattress deck may extend from the foot of the bed to a point more than halfway between the foot of the bed and the head of the bed when in the non-extended position, and the bed may further comprise a fixed platform attached to the base and/or the bed deck and extending from the head of the bed to a point short of the point to which the mattress deck extends, where the fixed platform has a top that lies in a plane with the top of the mattress deck.

The invention further relates to a method of making the bed described above, the method comprising activating the actuator to slide the mattress deck relative to the bed deck from the non-extended position to the extended position, making the bed, and activating the actuator in a reverse direction to slide the mattress deck back to the non-extended position.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a mattress deck slide for moving a mattress away from a wall for easy access for making the bed or changing the sheets. The mattress deck is particularly suitable for use in a recreational vehicle, but may also be used with any bed with an appropriate base.

Figure 1:
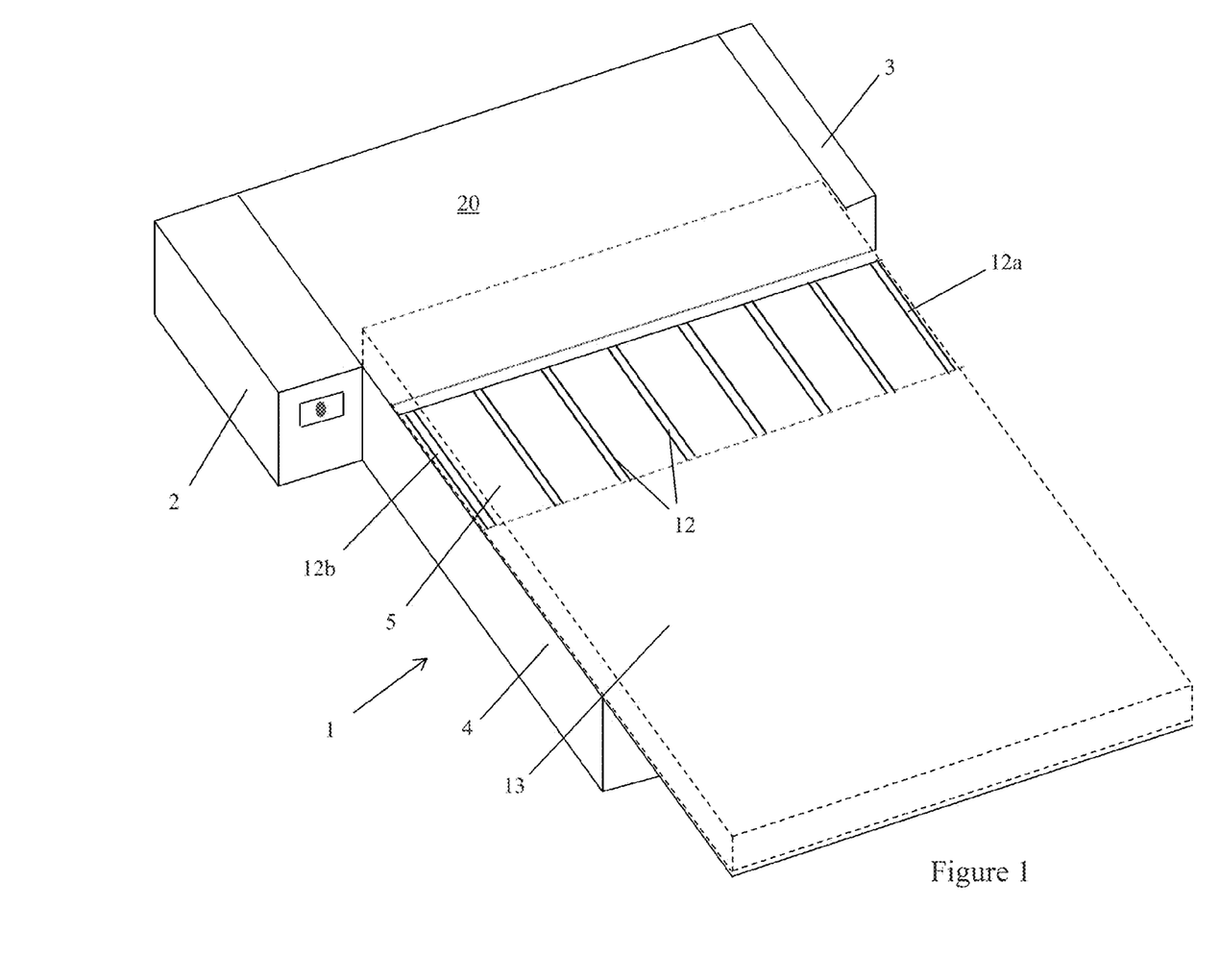
FIG. 1 is a perspective view of a bed deck with a mattress deck slide, showing the mattress deck slide in an extended position, with the location of a mattress indicated by dashed lines.
Figure 2:
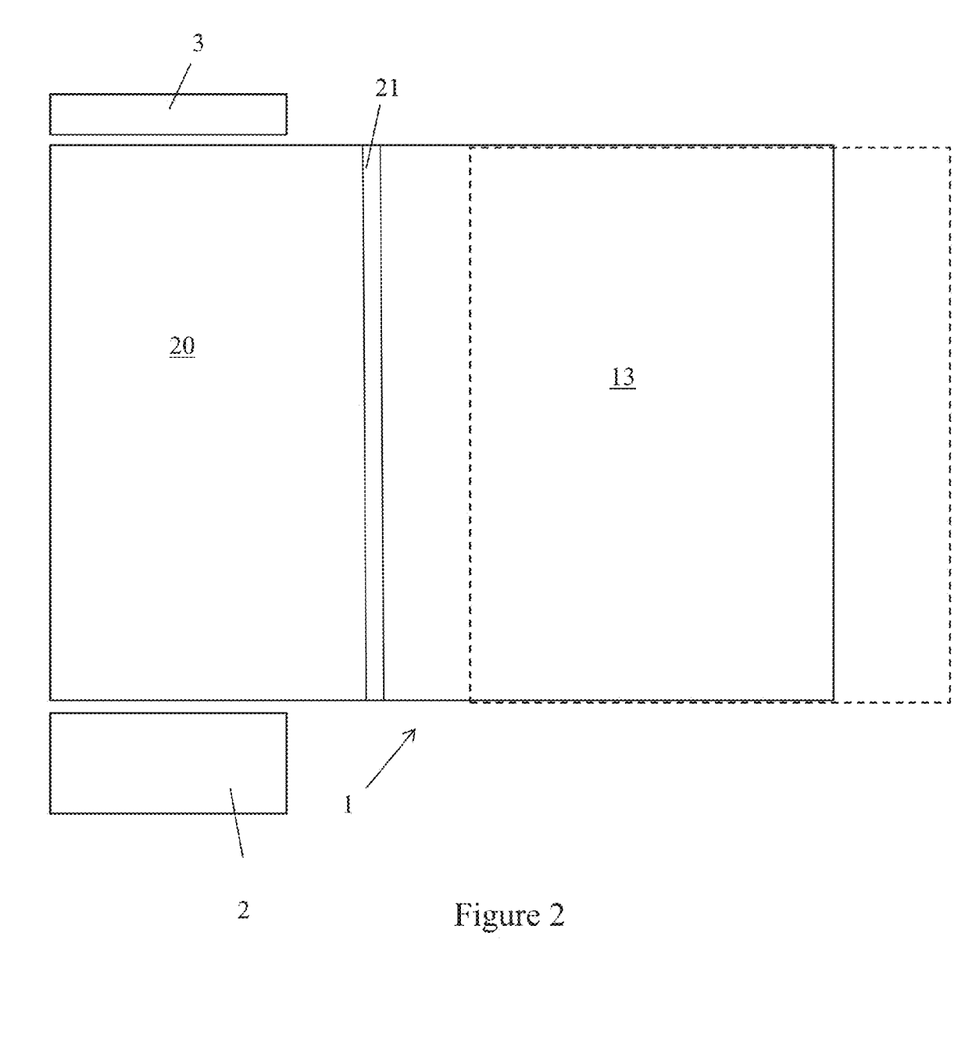
FIG. 2 is a top view of the bed deck with the mattress deck slide in a non-extended position, with the extended position indicated by dashed lines.

As seen in FIG. 1, a bed 1 may be located adjacent a nightstand 2 or other piece of furniture, limiting access to the head of the bed 1. A second object, such as a shelf 3, second nightstand, wall, etc., may be located adjacent the other side of the bed 1, further limiting access. One or both objects may be fixed, or may be heavy or otherwise not easily movable. The invention allows the bed's mattress, not shown but indicated by dashed lines, to be slid from its typical location, with its head located between the nightstand 2 and second object 3, to an extended position, as indicated by the dashed lines in FIG. 1. Thus, a user can easily access the head of the mattress while making the bed or changing the sheets without having to bend awkwardly around the nightstand 2 and second object 3.

Figure 6:
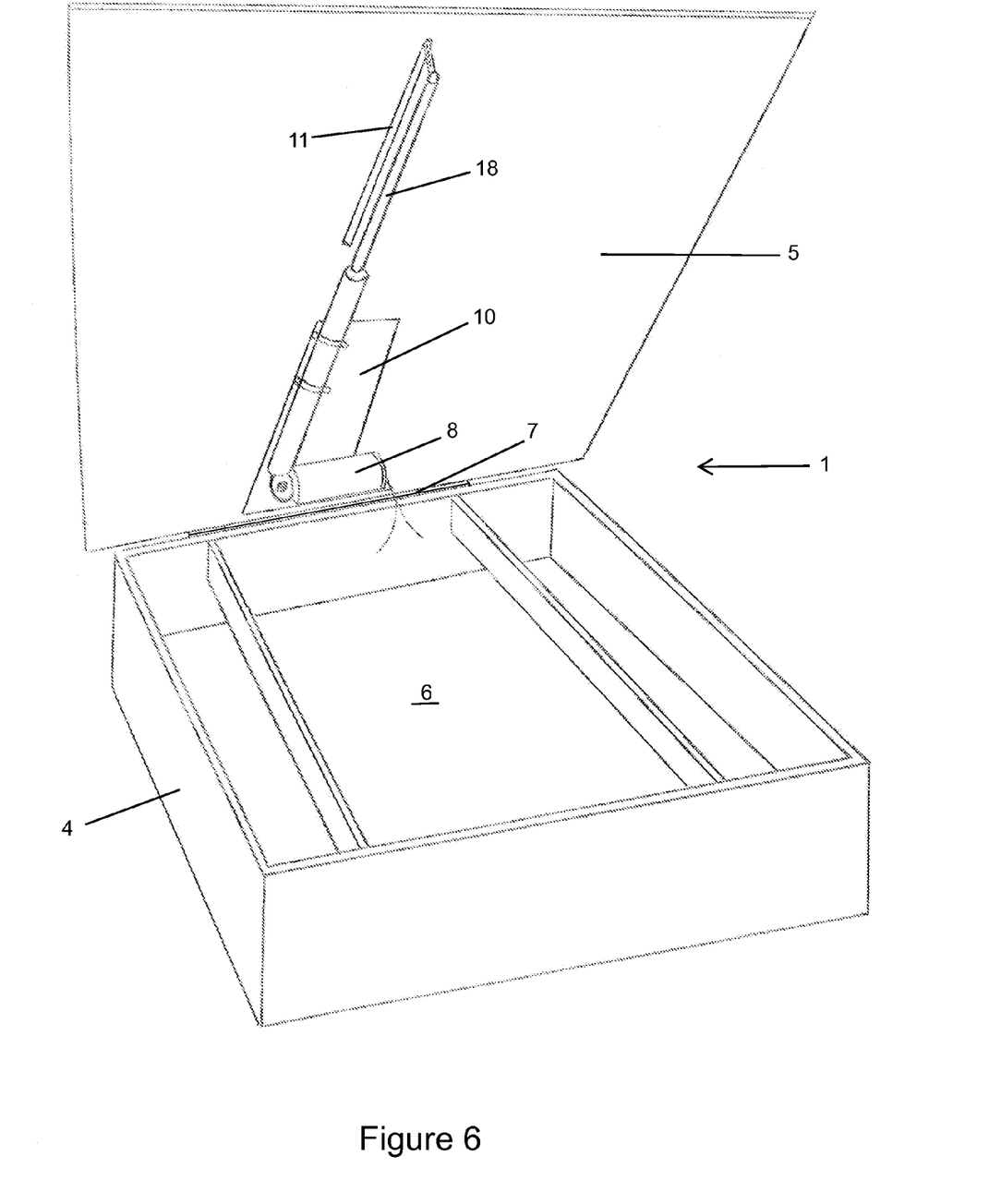
FIG. 6 is a perspective view of the bed deck with mattress deck slide with the bed deck raised from the base to show the underside of the bed deck and the actuator in position.
Figure 7:
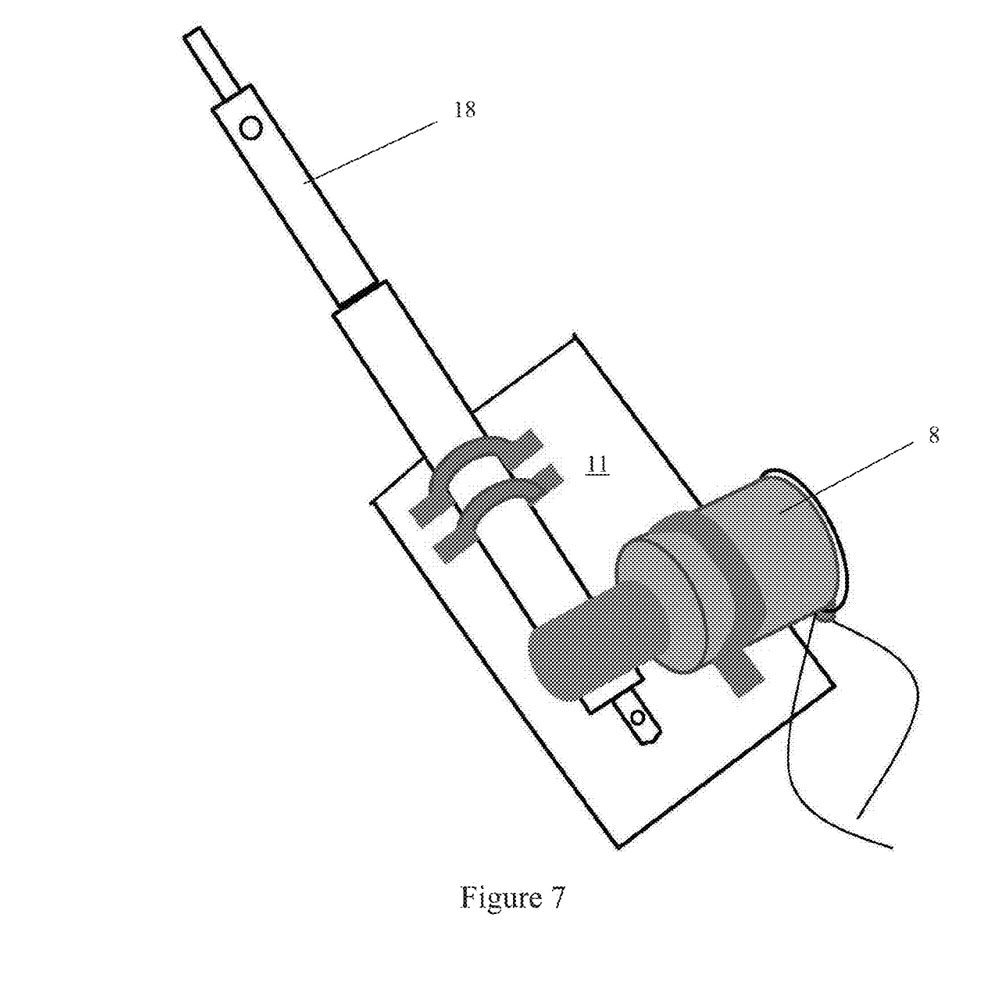
FIG. 7 is a close up perspective view of the actuator attached to the underside of the bed deck.

The bed 1 may comprise a base 4 and a bed deck 5, where the base 4 supports the bed deck 5 and has at least one hollow area 6 beneath the bed deck 5, as seen in FIG. 6. The bed deck 5 may be attached to the base 4 via hinges 7, providing access to the hollow area 6 by lifting the bed deck 5. The bed deck 5 may have an actuator 8 attached to its underside and extending into the hollow area 6. The actuator 8 may be bolted and/or strapped to the underside of the bed deck 5, either directly or via a block 10, as shown in FIG. 7. The actuator 8 may be a 12 volt linear actuator with 18 to 24 inch travel and a minimum of one pound load. The actuator 8 may be turned on by a switch, which may be a 12 volt double pole, double throw rocker switch with 10 amp inline fuse.

Figure 5:
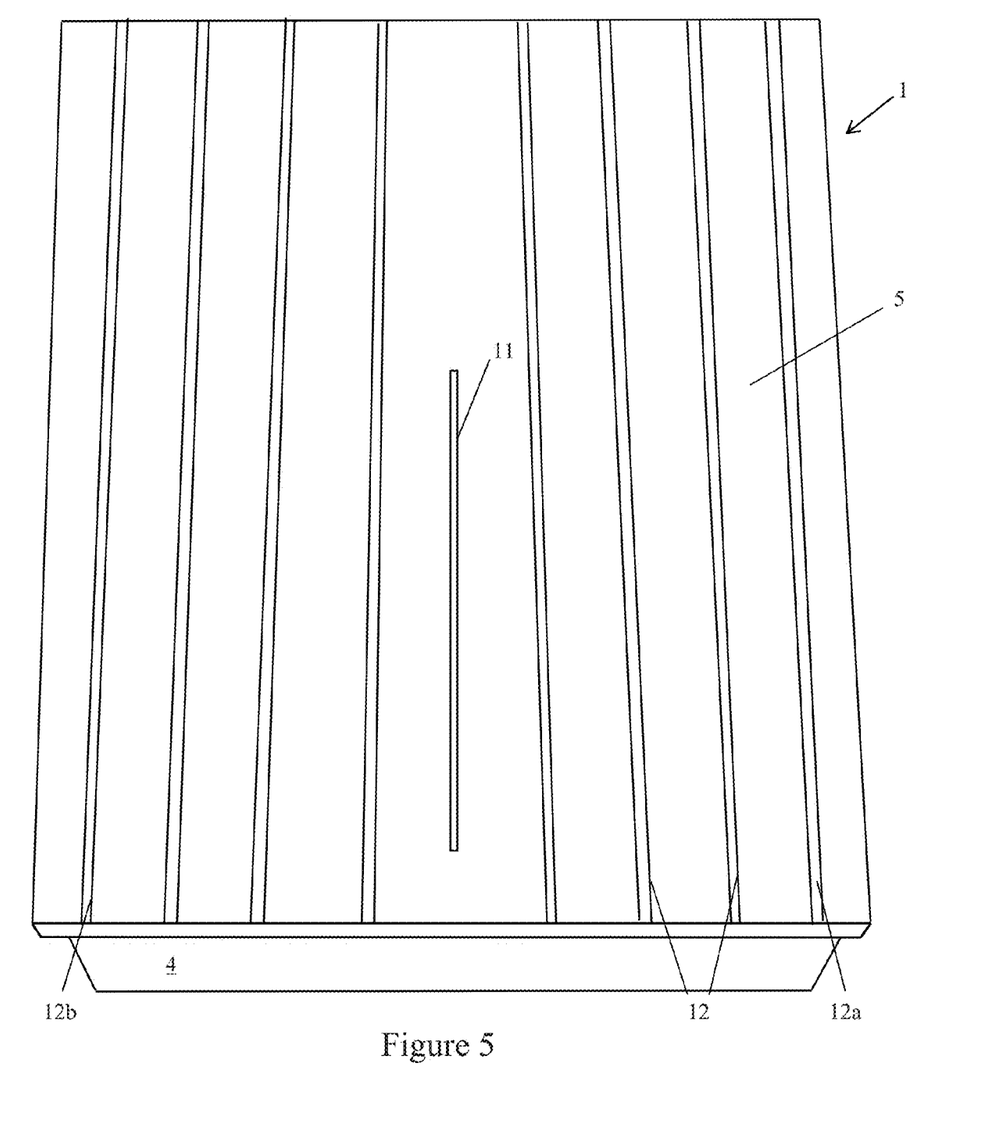
FIG. 5 is a perspective view of the top of the bed deck with the mattress deck slide removed.

A bolt 9 may extend downward through a slot 11 in the bed deck 5 and attach to the actuator 8. As seen in FIG. 5, the topside of the bed deck 5 may have a series of rails 12 running from the head of the bed 1 to the foot of the bed 1, parallel to the sides of the bed 1. In particular, rail 12a may be located near the right side of the bed deck 5, while rail 12b may be located near the left side of the bed deck 5. The slot 11 may be generally laterally centered, and may run parallel to the rails 12 and the sides of the bed 1.

Figure 4:
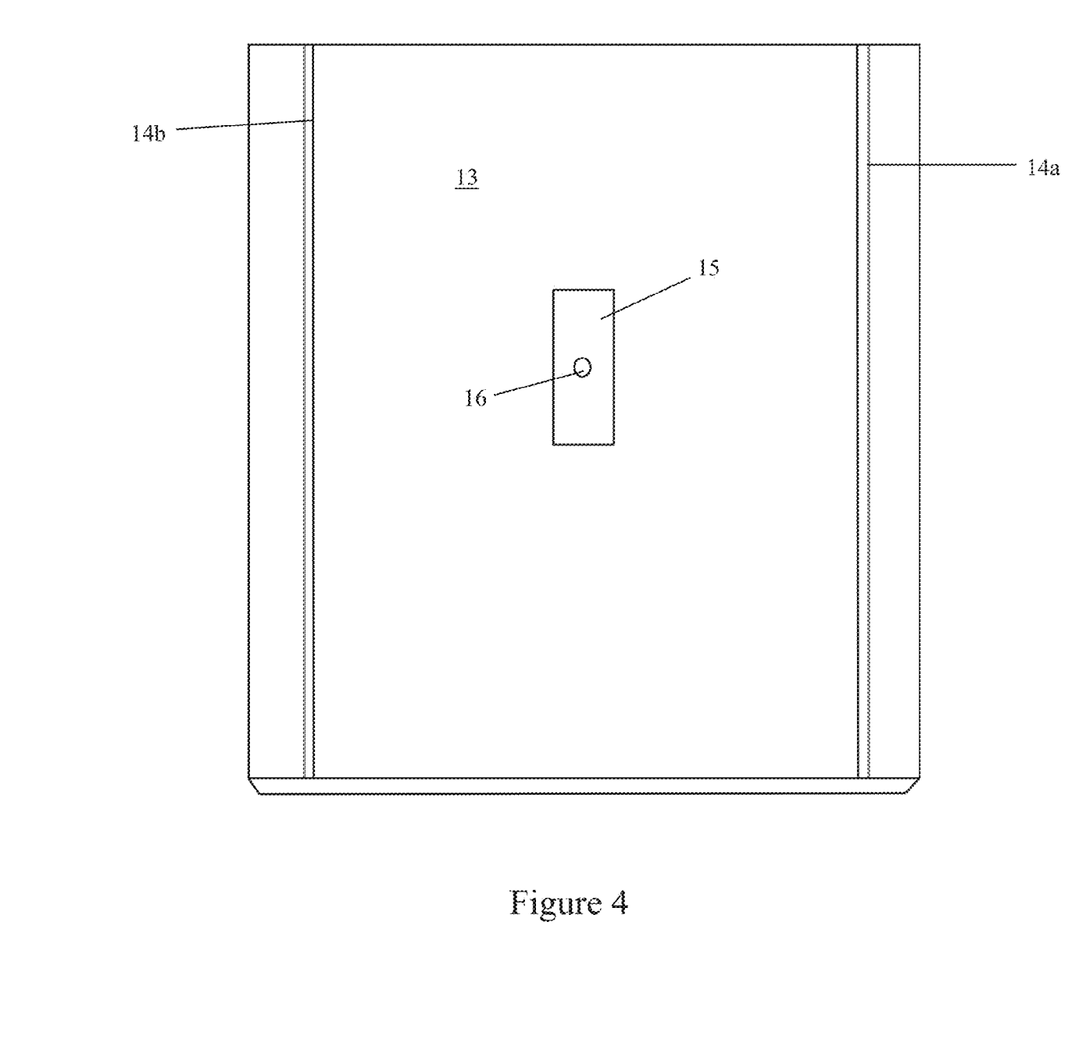
FIG. 4 is a perspective view of the underside of the mattress deck slide.

A mattress deck slide 13 may be located atop the bed deck 5. As seen in FIG. 4, the underside of the mattress deck slide 13 may have rails 14a and 14b corresponding to the rails 12a and 12b such that rails 14a and 14b are parallel to and adjacent to rails 12a and 12b when the mattress deck slide 13 is in place atop the bed deck 5. This allows the mattress deck slide 13 to slide up and down relative to the bed deck 5 without moving side to side. In particular, rail 14a may be located adjacent and to the left of rail 12a while rail 14b may be located adjacent to and to the right of rail 12b. Alternately, rail 14a may be located adjacent and to the right of rail 12a while rail 14b may be located adjacent to and to the left of rail 12b. A block 15 may be attached to the underside of the mattress deck slide 13, and a hole 16 may extend through both the block 15 and the mattress deck slide 13. The block 15 may attach to the mattress deck slide 13 via one or more attachment devices 17, such as screws or nails or other suitable devices.

Figure 3:
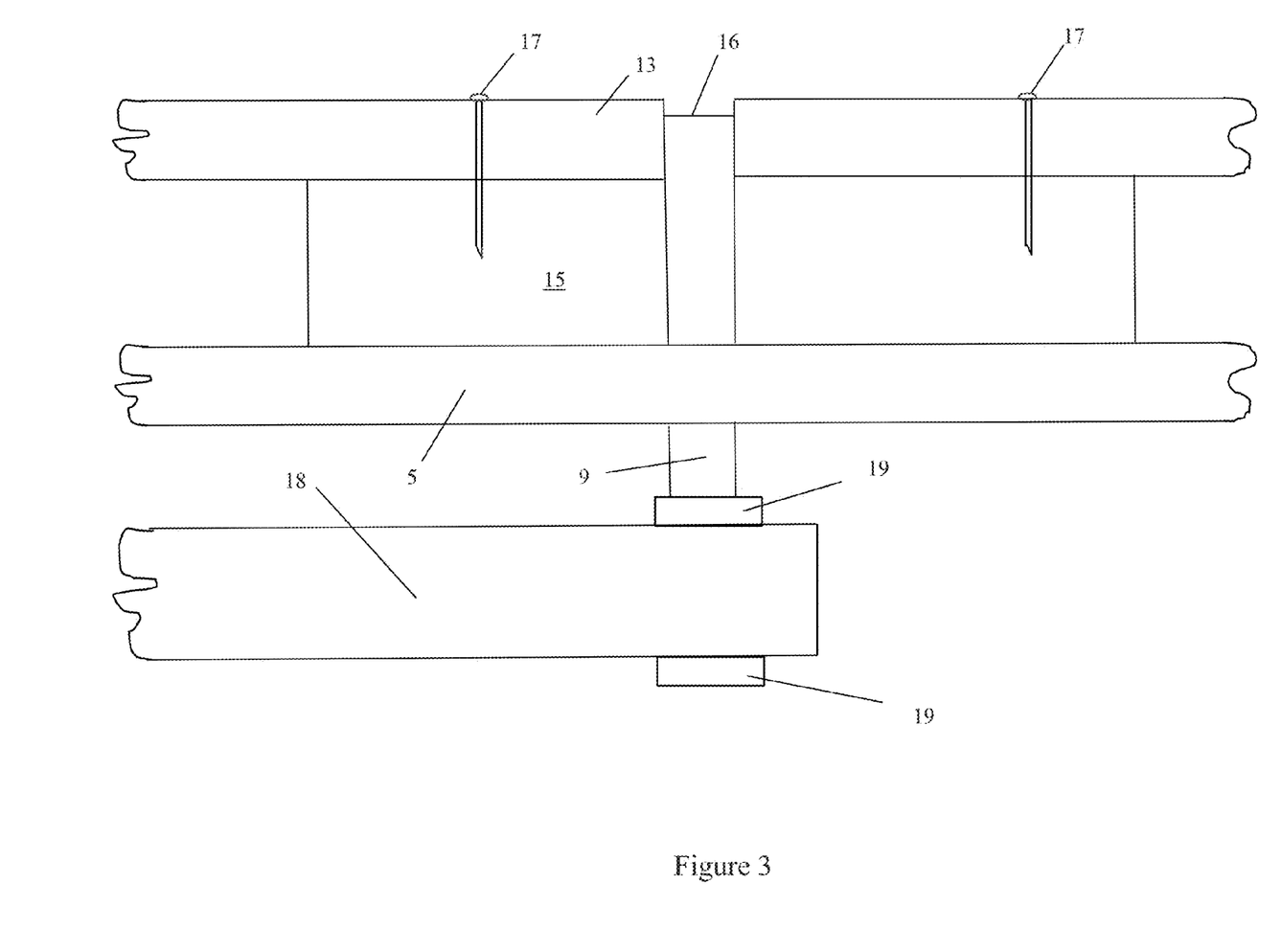
FIG. 3 is a side view of a portion of the bed deck with mattress deck slide.

As seen in FIG. 3, the bolt 9 may extend through hole 16 in the mattress deck slide 13 and block 15 and through the slot 11 in the bed deck 5 before attaching to the actuator shaft 18. The bolt 9 may be held in place with any suitable attachment device or devices 19, such as a nut with locking washer as shown in FIG. 3.

The mattress deck slide 13 may extend across the entire length of the bed 1. Alternately, as seen in FIG. 1, the mattress deck slide 13 may extend from the foot of the bed 1 only partially along the length of the bed 1, and the bed 1 may further comprise a fixed platform 20 at the head of the bed 1. The fixed platform 20 may be located such that its top is level with the top of the mattress deck slide 13 such that the head of the mattress may be supported by the fixed platform 20 and held level relative to the rest of the mattress. The fixed platform 20 may extend past the nightstand 2 such that the head of the mattress is always supported by the fixed platform 20 even when the mattress deck slide 13 is in an extended position. There may be a gap 21 between the fixed platform 20 and the mattress deck slide 13 when in a non-extended position to allow room for the bed deck 5 to be raised to access the hollow area 6.

The base 4, bed deck 5, mattress deck slide 13, and fixed platform 20 may be made of any suitable material or materials, such as wood, plastic, or metal. The rails 12 may be made of any suitable material, such as aluminum, steel, composite, wood, or PVC pipe. The rails 12 may comprise a ball bearing system, such as full extension ball bearing drawer glides. The rails 12 may keep the mattress deck slide 13 from traveling laterally and may additionally prevent sagging and bowing of the mattress deck slide 13 during use, providing stability to the mattress deck slide 13.

In use, the actuator 8 may cause the actuator shaft 18 to extend, which may cause the bolt 9 to pull the mattress deck slide 13 to a new position. The placement of the actuator 8, the slot 11, and the rails 12 and 14 may ensure that the mattress deck slide 13 moves between a non-extended position centered on the bed 1 and an extended position, where the sides of the mattress deck slide 13 remain aligned with the sides of the bed deck 5 but the mattress deck slide 13 as a whole is located horizontally downward from its non-extended position, with the foot of the mattress deck slide 13 extending outward from the foot of the bed deck 5, as shown in FIG. 1. The user may then make the bed 1 or change the sheets and then may use the actuator 8 to return the mattress deck slide 13, and consequently the mattress, to the non-extended position for use.

The mattress deck slide 13 may be included in the bed 1 when it is originally built or may be retrofit thereto at a later date.

Whereas, the devices and methods have been described in relation to the drawings and claims, it should be understood that other and further modifications, apart from those shown or suggested herein, may be made within the spirit and scope of this invention.

What is claimed is:

1. A bed for use with a recreational vehicle, with a head, a foot, and two opposing sides, the bed comprising:
   a base;
   a bed deck atop the base, where the bed deck has a top and a bottom and where the bed deck is attached to the base via one or more hinges such that the bed deck may be pivotally lifted from the base to access the bottom of the bed deck and a hollow area in the base under the bed deck for storage;
   a mattress deck atop the bed deck, where the mattress deck has a top and a bottom; and
   an actuator attached to the bottom of the bed deck and extending into the hollow area, where the actuator has a shaft attached to the mattress deck such that activating the actuator causes the mattress deck to slide relative to the bed deck from a non-extending position to an extended position and vice versa;
   a hole in the mattress deck;
   a slot in the bed deck, where the slot runs parallel to the sides of the bed and is aligned at one end with the hole in the mattress deck when the mattress deck is in the non-extended position and at the other end with the hole in the mattress deck when the mattress deck is in the extended position; and
   a bolt extending through the hole in the mattress deck and the slot in the bed deck and attached to the shaft of the actuator such that actuating the actuator causes the bolt to travel from one end of the slot to the other end of the slot, which causes the mattress deck to travel relative to the bed deck.

2. The bed of claim 1 where:

the bed deck has a plurality of rails attached to the top of the bed deck, where the rails are parallel to each other and to the sides of the bed; and the mattress deck has at least two rails attached to the bottom of the mattress deck, where the rails are parallel to each other and to the sides of the bed and where the rails are each located such that they are adjacent to one of the rails of the bed deck.

3. The bed of claim 1 where the actuator is positioned such that the mattress deck slides toward the head of the bed or toward the foot of the bed, but not toward either side of the bed.

4. The bed of claim 1 where the mattress deck extends from the foot of the bed to a point more than halfway between the foot of the bed and the head of the bed when in the non-extended position, the bed further comprising a fixed platform attached to the base and/or the bed deck and extending from the head of the bed to a point short of the point to which the mattress deck extends, where the fixed platform has a top that lies in a plane with the top of the mattress deck.

5. A method of making a bed for use with a recreational vehicle, the method comprising:

activating an actuator, where the actuator is located in a base of the bed and is attached to a bed deck atop the base, where the bed deck has a top, a bottom, and two sides, where the actuator is attached to the bottom of the bed deck and extends into a hollow area in the base under the bed deck, where the bed deck is attached to the base via one or more hinges that allow the bed deck to be pivotally lifted to access the bottom of the bed deck and the hollow area in the base used for storage, where the actuator has a shaft attached to a mattress deck atop the bed deck via a bolt extending through a slot in the bed deck and attaching to the mattress deck at an attachment point, where the slot runs parallel to the sides of the bed deck and is aligned at one end with the attachment point when the mattress deck is in a non-extended position and at the other end with the attachment point when the mattress deck is in an extended position, such that activating the actuator causes the mattress deck to slide relative to the bed deck from the non-extended position to the extended position;

making the bed; and activating the actuator in a reverse direction to cause the mattress deck to slide from the extended position to the non-extended position.

6. The method of claim 5 where the bed has a head, a foot, and two opposing sides and where the mattress deck slides toward the foot when sliding from the non-extended position to the extended position and toward the head when sliding from the extended position to the non-extended position, but does not slide toward either side of the bed.

\* \* \* \* \*